FIG. 1-A.

INVENTORS.
Paul T. Nims,
BY Omer E. Bowlus.
Harness and Harris
ATTORNEYS.

FIG. 1-D

INVENTORS.
Paul T. Nims,
Omer E. Bowlus.
BY
Harness and Harris
ATTORNEYS.

Patented Oct. 15, 1946

2,409,581

UNITED STATES PATENT OFFICE 2,409,581

ELECTRICAL CONTROL SYSTEM

Paul T. Nims and Omer E. Bowlus, Detroit, Mich., assignors to Chrysler Corporation, Highland Park, Mich., a corporation of Delaware Application November 30, 1944, Serial No. 565,956

16 Claims. (Cl. 172—281)

The present invention relates to electrical control systems and is particularly directed to the provision of improved apparatus which functions as a combination converter-inverter for deriving alternating current energy of a desired adjustable frequency from a source of alternating current the frequency whereof may be randomly variable over a range which is above, below, or which includes, the output frequency. In its herein illustrated embodiments the present invention is particularly designed for aircraft purposes, and serves to translate the variable frequency output of one or more engine driven generators into a three phase alternating current output of adjustably fixed frequency. In certain of its aspects the present invention is directed to improvement upon the inventions disclosed and claimed in the copending application of the present applicant, Nims, Serial No. 565,955, filed November 30, 1944. Certain features disclosed but not claimed herein are claimed in the copending application of the present applicant, Bowlus, Serial No. 565,954, filed November 30, 1944.

Principal objects of the present invention are to provide a system of the aforesaid type which is simple in arrangement, requires a minimum number of structural elements, is relatively light in weight, and is reliable and efficient in operation; to provide such a system in which multiphase alternating current input energy is translated into multi-phase alternating current output energy; to provide such a system embodying improved means for timing the operations of the control apparatus associated with the several output phases; to provide such systems in which the multi-phase output circuits of the several units may be connected in parallel, and embodying improved means for synchronizing the control apparatus of the several units; and to generally improve and simplify the construction and arrangement of systems of the above generally indicated type.

With the above as well as other and more detailed objects in view which appear in the following description and in the appended claims, a preferred but illustrative embodiment of the invention is shown in the accompanying drawings throughout the several views of which corresponding reference characters are used to designate corresponding parts and in which:

Figure 2 is a series of curves depicting various operating characteristics of the system.

It will be appreciated from a complete understanding of the present invention that in their broader aspects the improvements thereof may be embodied in widely differing systems, arranged for widely differing specific purposes. The system specifically disclosed herein is particularly designed for use on multi-engine aircraft, to furnish three phase alternating current for various control and operating purposes. The disclosure herein of the invention with particular reference to this application is, however, to be regarded in an illustrative and not in a limiting sense.

As is indicated above, it is desirable, in connection with modern aircraft, to provide self-contained generating systems of the alternating current type, which are adapted to deliver alternating current at an adjustably fixed frequency and voltage, and which utilize, as a prime source of power, alternating current generators which are driven by the aircraft engines. Since the aircraft engine speeds vary rather widely in operation, the frequency of the alternating current generators also vary, making it desirable to provide apparatus which is effective to translate alternating current of a variable frequency into current having a frequency which is adjustably fixed, and which may fall below, within, or above the frequency range of the generator. The aforesaid copending application of the present applicant Nims, Serial No. 565,955, filed November 30, 1944, discloses and claims certain features of such systems, which, as specifically disclosed, are effective to deliver single phase alternating current. The present system on the other hand is arranged to deliver multi-phase alternating current, a three phase output being specifically shown herein.

Figure 1:
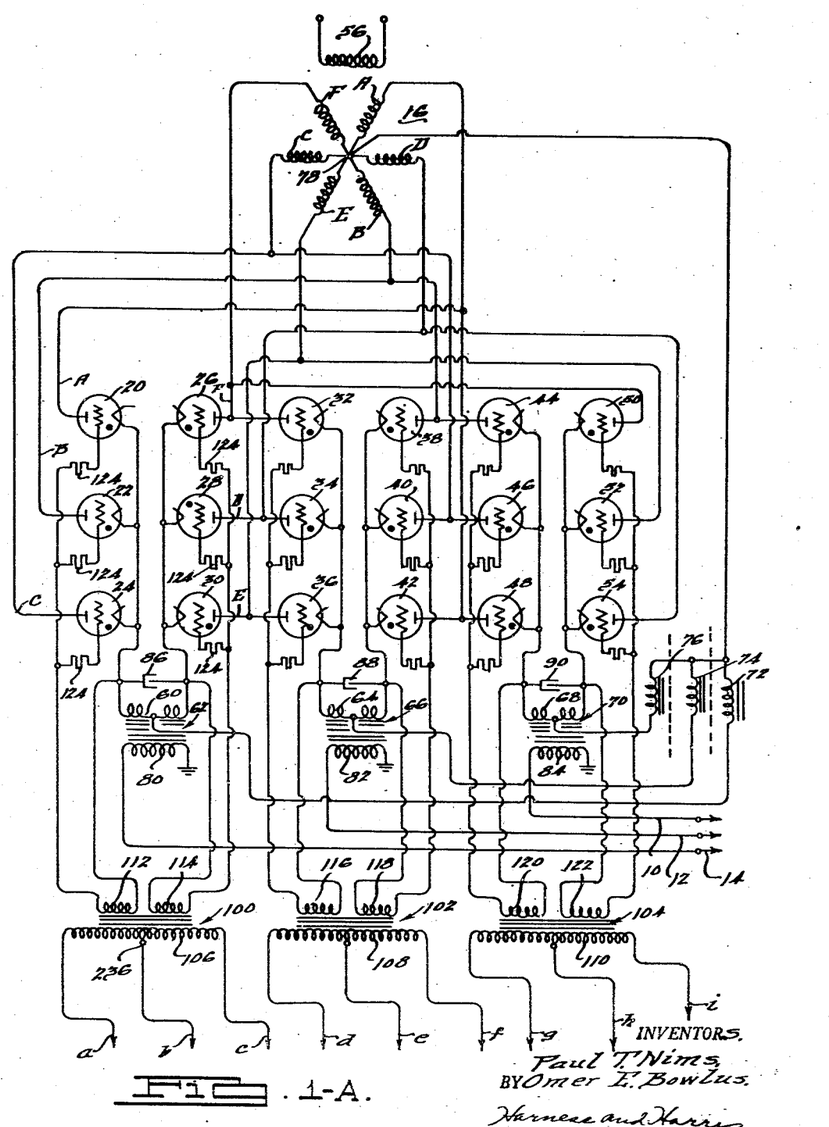
Figures 1A, 1B, 1C, and 1D collectively provide a diagrammatic arrangement of power and control circuits for two units of the present invention, arranged to supply a multi-phase output circuit in parallel with each other. In reading the drawings, Figure 1B may be placed immediately to the right of Figure 1A, Figure 1C may be placed immediately below Figure 1A, and Figure 1D may be placed immediately below Figure 1B. When the drawings are so arranged unconnected terminals on the various sheets will line up with correspondingly designated unconnected terminals on the adjacent sheets, thereby completing the circuits which extend from one sheet to another.
Figure 5:
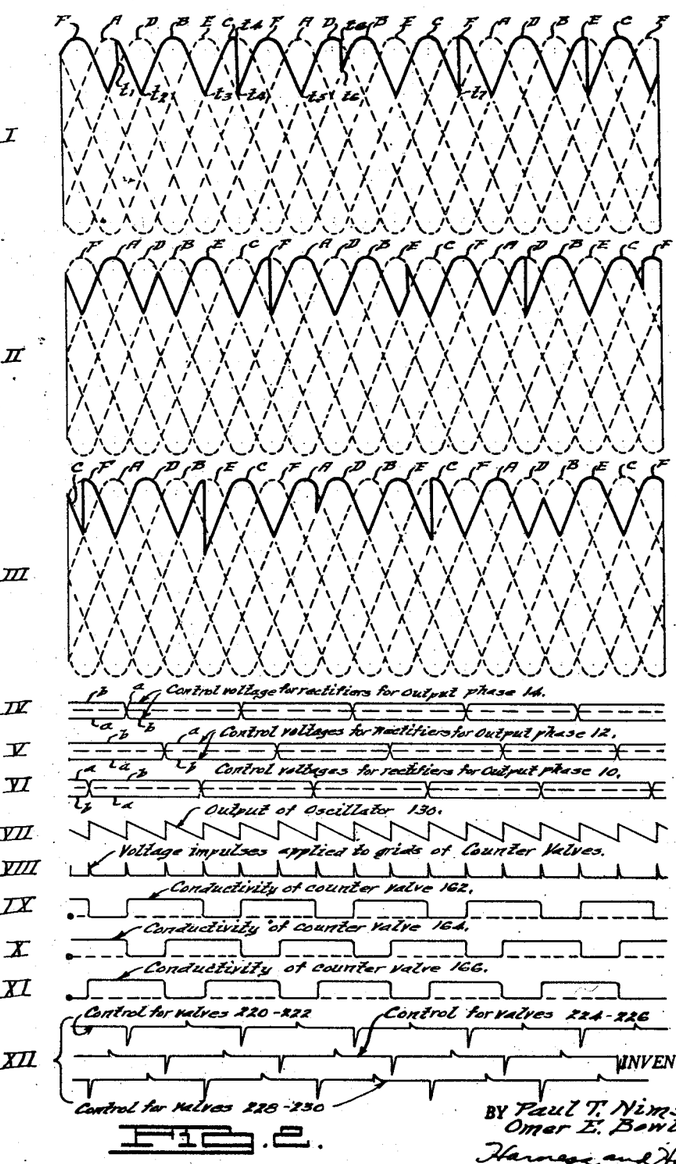

Figures 1A and 1B show the power circuits for two substantially identical units, each comprising a main generator adapted to be driven for example by a corresponding engine of the associated aircraft and arrangements are shown for connecting the output circuits of the two units in parallel. Similarly, Figures 1C and 1D show virtually identical control circuits for the power units of Figures 1A and 1B respectively and also show the synchronizing interconnections between such control systems. For these reasons a description of one power and one control unit will suffice for a description of both, except in the respects hereinafter noted.

Referring first to Fig. 1A, power is arranged to be delivered to the three phase output conductors 10, 12, and 14, from an alternating current generator 16, through a combination converter-inverter comprising three series of main electric valves 20—22—24—26—28—30; 32—34—36—38—40—42; and 44—46—48—50—52—54.

Generator 16 may be of usual construction and may be arranged to be driven either directly or, preferably, through suitable change-speed gearing, by a corresponding engine of the aircraft. Generator 16 is provided with a usual direct current field winding 56 which, as described in the aforesaid Nims application, may be provided with regulating apparatus which serves to maintain the voltage of generator 16 at a substantially uniform value through the expected generator operating speed range, which in the case of aircraft systems, may be from 4,000 to 10,000 R. P. M. Such regulating apparatus may also be arranged as described in the Nims application to maintain a proper division of the load between two or more of the present power units when such units are operated in parallel with each other.

Each of the aforesaid main valves may be of any conventional type. Preferably and as indicated they are usually three element gas-filled grid controlled valves of the so-called discontinuous type. That is to say, each of these valves, though normally non-conductive, may be rendered conductive, when their anodes are sufficiently positive with respect to their cathodes to sustain a discharge, by rendering their grids sufficiently positive with respect to their cathodes. When so rendered conductive, the grids lose control and the valves remain conductive until the anodes are either negative with respect to their cathodes or are not sufficiently positive to sustain a discharge. It will be noticed that the cathodes of related groups of these valves are directly interconnected so that, although structurally separate rectifiers are illustrated, multi-anode structures may be used instead. That is to say, for example, valves 20, 22, and 24 may be combined into a single multi-anode structure.

Generator 16 is illustrated as having six star connected phase windings A, B, C, D, E, and F, which are directly connected to the anodes of the corresponding main valves. That is to say, phase A is directly connected to the anodes of valve 20, associated with output conductor 14, valve 42 associated with output conductor 12, and valve 48 associated with output conductor 10. Phase B in turn is connected to the anodes of valves 22, 38, and 44 associated respectively with output phases 14, 12, and 10. Corresponding comments apply to the other generator phases, it being noted that each generator phase is associated with and is effective to supply current, under the conditions hereinafter stated, to one phase of the output circuit.

The cathodes of the main valves associated with output phase 14 are connected to the respective terminals of the primary winding 60 of an associated transformer 62. Similarly, the cathodes of the main valves associated with output phase 12 are connected to the terminals of the primary winding 64 of an associated transformer 66, and the cathodes of the main valves associated with output phase 10 are connected to the terminals of the primary winding 68 of an associated transformer 70. Primary windings 60, 64, and 68 are provided with center taps which are connected through corresponding reactors 72, 74, and 76 to the center tap 78 of the generator 16. Reactors 72, 74, and 76 may be and preferably are magnetically independent of each other, which relation is indicated by the dashed lines appearing therebetween.

Transformers 62, 66, and 70 are provided with grounded secondary windings 80, 82, and 84, which as shown, are directly connected to the corresponding load conductors 14, 12, and 10, which load conductors for the two parallel units are directly connected.

Commutating condensers 86, 88, and 90 are connected directly across the corresponding transformers 62, 66, and 70 and serve to control the conductivity of the associated valves, in the hereinafter described manner.

To control the initiation and duration of the successive positive and negative half cycles of the output phases 14, 12, and 10, and to determine the displacement, in electrical degrees, between the voltages induced in such phases, corresponding control transformers 100, 102, and 104 are provided. These control transformers are provided respectively with center tapped primary windings 106, 108, and 110, and are also provided respectively with pairs of secondary windings 112 and 114; 116 and 118; and 120 and 122. The terminals of windings 112 and 114 are connected, respectively in series with current limiting resistors 124, between the grids and cathodes of valves 20—22—24 and 26—28—30. Windings 116 and 118, and 120 and 122 in turn are correspondingly connected between the grids and cathodes of the remaining associated valves.

In accordance with this embodiment of the present invention, alternating voltages of approximately square wave form are induced in the secondary windings 112—114—116—118—120—122, the voltages in the two windings of each pair being 180 degrees out of phase with each other, and the voltages of the respective pairs being 120 degrees out of phase with each other. The control circuits for effecting such energization of the secondary windings of the control transformers are shown in Figures 1C and 1D, and are described hereinafter. As will be appreciated, and as is diagrammatically shown in portions IV, V, and VI of Figure 2, the above-described control voltages render the grids of the associated main valves alternately positive and negative with respect to their cathodes, so as to cause successive positive and negative half cycles of voltage to be induced in the respective output windings 80—82—84.

It is believed that the operation of the above described power circuits will be apparent from a description of the operation of the converter-inverter circuits associated with, for example, the output phase 14. At the time $t_1$ in Figure 2, control winding 112 becomes effective to positively bias the grids of valves 20—22—24, and winding 114 becomes effective to negatively bias the grids of the associated valves 26—28—30. As is described below, the latter action prevents any discharges in the last-mentioned valves, and it will be understood that the former action tends to render the valves 20—22—24 conductive. At the time $t_1$, phase A is most strongly positive and, because of the common cathode connections of the last-mentioned valves, this fact renders the cathodes of valves 22 and 24 positive with respect to their anodes and prevents the initiation of a discharge therethrough. Valve 20 is, however, conductive, and current may flow therethrough from phase A through the left-hand half of the associated primary transformer winding 60, and through the corresponding reactor 72. At the time $t_2$ in Figure 2, the potential of phase B rises to a value sufficiently in excess of the voltage of phase A to render valve 22 conductive, and initiate a flow of current from phase B through valve 22 and the left-hand half of primary winding 60. Conduction through valve 22 elevates the potential of the cathode of valve 20 to a value above that of its anode, and extinguishes the discharge through valve 20. Similarly, at approximately the time $t_3$, the voltage of phase C rises to a value above that of phase B, initiating a discharge through valve 24 and extinguishing the discharge through valve 22.

The aforesaid flow of current from the source charges up the associated commutating condenser 86, bringing its left-hand terminal to a positive potential and its right-hand terminal to a negative potential. This full charge is preferably obtained just prior to each commutation point, in this case, $t_4$. Throughout this interval, phases D, E, and F, are to varying degrees, positive, and the negative potential established for their cathodes by winding 60 and condenser 86, tends to cause flow of current through valves 26—28—30. Such current flow is prevented, however, by the strong negative bias applied to the grids of these valves by control winding 114.

At the time $t_4$ in Figure 2, the polarities of windings 112 and 114 are reversed, which reversed relation is maintained until the time $t_6$. The negative polarity of control winding 112 negatively biases valves 20—22—24 which action is without effect on valves 20 and 22 since these rectifiers are not conducting at the time $t_4$. The negative bias applied to the conducting valve 24 tends to extinguish the discharge therethrough, and may, with certain classes of valves, be effective to do so.

The positive bias applied to valves 26—28—30 by control winding 114 tends to render all of these valves conductive. At the time $t_4$, however, phase F is more positive than phases D and E and consequently valve 26 is the only one of the just-mentioned three valves which becomes conductive. This action "initiates," in the sense discussed below, the negative half cycle of voltage of output phase 14. As soon as valve 26 becomes conductive, it elevates the right-hand terminal of condenser 86 to a value which is lower than the voltage of phase F by only the amount of the relatively small voltage drop through valve 26. By virtue of the charge then existing on condenser 86, this action immediately elevates the cathode potentials of all of valves 20, 22, and 24 to values well above their anode potentials and extinguishes any discharges existing therein. The reversal of the charging voltage applied to condenser 86 when valve 26 becomes conductive enables the initial charge to dissipate itself through winding 60 and further enables a reverse charge to be built up on condenser 86. This reverse polarity renders the cathodes of valves 20—22—24 strongly negative with respect to their anodes, which action is, however, ineffective to re-establish a discharge through any thereof in view of the negative bias applied to the grids. It is to be noted that the time required for the discharge of condenser 86 is longer than the de-ionization time of the just-mentioned valves. Consequently, the grids of these valves are enabled to obtain control thereof and maintain them non-conductive as aforesaid. It is believed to be evident that at the time $t_5$, the flow of current through winding 60 transfers from phase F and valve 26, to phase D and valve 28. Further, it is believed to be evident that at the time $t_6$, at which time the original polarities of windings 112 and 114 are restored, valve 28 is extinguished, and the next succeeding positive half cycle of output phase 14 is "initiated" from phase B through valve 22. It will be noticed from portion I of Figure 2 that with the assumed frequency relations between the input and the output circuits, that during the first above described positive half cycle of the output phase 14, phases A, B, and C successively deliver current, through valves 20—22—24. During the first described negative half cycle on the other hand valves 26 and 28 carry the current, which is derived from phases F and D. During the positive half cycle represented by the interval $t_6t_7$, valves 22 and 24 conduct current from phases B and C. It will thus be apparent that the number of phases and valves which supply current to output phase 14 varies during successive half cycles of the same polarity and during successive half cycles of different polarity. The full lines in portion I of Figure 2 indicate the time intervals throughout which the correspondingly designated phases are effective to supply current to output phase 14.

Considering now the general form of the voltage wave induced in the secondary winding 80 of transformer 62, and the phase relation of this induced voltage relative to the output voltages of control transformer 100, it will be appreciated that so long as valves 20—22—24 are conductive they tend to cause a flow of current through the left-hand half of the primary winding 60 of the associated output transformer, resulting in, for example, a positive half cycle of induced voltage in secondary winding 80. Conversely, when valves 26—28—30 are conductive they tend to cause a flow of current through the right-hand half of winding 60 and induce a half cycle of voltage of negative polarity in winding 80. The impedances in the converter-inverter network delay the induced voltage in winding 80 by a phase angle equal to a fraction of a half cycle of the output frequency. This delay or phase shift may, in a general sense, be explained as follows. At each commutation point, such as the time $t_4$ in Figure 2, the commutating condenser 86 is charged, as aforesaid. When, at time $t_4$, valve 26 becomes conductive, condenser 48 is enabled to elevate the potentials of the cathodes of valves 20—22—24 as aforesaid. Condenser 86 also elevates the potential of the center tap of winding 60. These changes in potential are of course enabled by the associated reactor 72. The energy stored in condenser 86 prevents an immediate reversal of the induced voltage in winding 80, such induced voltage falling to zero only after the expiration of an interval determined in part at least by the characteristics of the previously described discharge circuit for condenser 86. Similar comments apply to the delayed reversal of the induced voltage in winding 80 which is initiated at each other commutation point such as the time $t_6$.

The form of the induced voltage wave in winding 80 is of course determined by the relative impedances in converter-inverter network as a whole and it is preferred to so proportion these impedances as to produce an induced voltage of approximately the wave form shown in the aforesaid Nims application.

It will be observed accordingly that although the transfer action between valve groups which takes place at each commutation point, does not necessarily result in an immediate reversal of the induced voltage in the corresponding output winding, such as 60, such transfer action does "initiate" or result in such a reversal.

The operation of the valve banks associated with output phases 12 and 10 is the same as that described above with the exception that the control voltages applied to these banks are displaced 120 degrees with respect to each other and with respect to the control voltages for output phase 14. Portions II and III of Figure 2 indicate, in full lines, the intervals, with respect to the corresponding control voltages (portions V and VI respectively) during which the indicated phases are effective to supply current to the corresponding output phases.

By examination of portions I, II, and III of Figure 2, it will be noticed that at any given time, for example, the time $t_1$, phase A is effective to deliver current for each of output phases 14 and 12. Beginning at the time $t_2$, in turn phase D is effective to deliver current to each of output phases 12 and 10. A particular generator phase, therefore, serves to deliver current to a plurality of output phases at the same time.

So long therefore as the above-mentioned synchronously timed control voltages are developed by the control transformers 100, 102, and 104, the six phase variable frequency input power is translated into a three phase output having a frequency equal to that of the energy applied to the control transformers. It will further be appreciated from the foregoing that the input and output frequencies are virtually independent of each other, thus accommodating the system to the relatively unusual case in which the input and output frequencies are identical, as well as to the more usual case in which they differ. It should be noted that the loading of the individual phases of the generator has a substantially uniform average value, for any given output load, although at certain frequencies, the average loading of the individual valves is not uniform. This circumstance makes it desirable, of course, to utilize valves of sufficiently large capacity to reliably handle any unbalanced loading conditions.

It will be appreciated that in the broader aspects of the invention, the main generator may be provided with a different number of phases than the illustrated six phases. For example, a three phase generator may be used, as disclosed in the aforesaid Nims application. In utilizing a three phase generator it will be appreciated that each phase winding is connected to twice the number of anodes as in the present case. That is, a particular phase winding would be connected to all of the anodes to which, for example, phases A and D of the present generator are connected and so on.

Referring now to Figure 1C, the illustrated arrangement for energizing the above described control transformers 100, 102, and 104 in the previously described accurately timed relation, comprises generally an oscillator circuit 130, which serves as a source of periodic voltage; a counter-network 132, which serves to segregate successive impulses from the oscillator circuit and appropriate them in proper order to the respective output phases; and a series of three inverter networks 134 which respond to the counter-network and control the delivery of energy to the respective control transformers 100, 102, and 104.

The oscillator circuit 130 may, in general, be of any usual type and as illustrated, comprises a usual grid controlled gas-filled valve 140 of the previously mentioned discontinuous control type. Valve 140 is connected across terminals 142 and 144 of an illustrative source of power, in series with the primary winding of a synchronizing transformer 146, a timing condenser 148, and a potentiometer resistor 150. Usual gas-filled voltage regulating glow tubes 152 and 154 are interposed between terminals 142 and 144 and serve, as will be understood, to maintain the voltage between these just-mentioned terminals at a substantially uniform value, terminal 144 being grounded and terminal 142 being indicated, for illustrative purposes, as having a potential of 240 volts. Neglecting the action of the synchronizing transformer 146, it will be appreciated that when valve 140 is conductive, current is enabled to flow therethrough and charge up condenser 148, which current flow is surge-like in character. By virtue of the inductance in the plate circuit of the valve, the completion of this charging action is accompanied by a momentary reversal of the voltage across the valve which temporarily renders its cathode positive with respect to its anode. This action blocks the valve and enables the energy stored in condenser 148 to dissipate itself through resistor 150. As this charge is progressively dissipated, the potential of the cathode of valve 140 is correspondingly lowered, thereby progressively increasing the anode-cathode voltage across the valve. When the latter voltage reaches a critical value valve 140 again breaks down and passes an impulse of current. Valve 140 is thus rendered conductive and non-conductive periodically, at a frequency determined primarily by the characteristics of the discharge circuit for condenser 148, each conductive period being a very minor fraction of each non-conductive period. During each conductive period the potential of the adjustable tap 156 on resistor 150 abruptly rises and during each non-conductive interval, such potential gradually falls to a normal value. The potential of tap 156 is thus of the usual saw-tooth wave form, as indicated in portion VII of Fig. 2.

The corresponding oscillator for the companion unit (Figure 1D) duplicates the unit just described, it being noted that the secondary winding of each synchronizing transformer is tied to the grid of the oscillator valve 140 for the other unit. More particularly, the grid cathode circuit for valve 140 of the unit shown in Figure 1C extends from the ground terminal 144 through the corresponding valve 140, conductor 158, thence through the secondary winding 160 of the companion synchronizing transformer 146 to the corresponding ground terminal 144 (Figure 1D). It will be appreciated accordingly that each time valve 140 of one unit breaks down, a voltage impulse is transmitted through the secondary winding of the corresponding winding synchronizing transformer 146, which voltage impulse breaks down the valve 140 associated with the other unit. The oscillator circuits for the two units are thus caused to operate in synchronism with each other.

It will be appreciated that the output frequency of each oscillator circuit is determined primarily by the desired output frequency of the power circuit and by the number of phases of the power circuit. In the present arrangement three output phases are provided and two impulses per output phase are required from the oscillator circuit. Accordingly, assuming a 400 cycle output frequency, it will be appreciated that the oscillator circuits are adjusted to have a frequency of 2,400 cycles per second.

Each counter-network comprises primarily a series of three valves, 162, 164, and 166, which preferably, but not necessarily, are of the high vacuum continuous control type. The cathodes of these valves are connected together and to the ground terminal 144. The anodes of these valves are connected, through control resistors 168, 170, and 172, to a supply conductor 174, which is maintained, by regulator valves 152 and 154, at an intermediate potential, of the order, for example, of 150 volts. The grids of valves 162 and 164 are continuously tied to terminal 176, which is intermediate resistor 172 and the anode of valve 166, which grid circuits include resistors 178, 180, and 182. The grid circuit for valve 162 also includes a delaying condenser 184, which functions as hereinafter described. Similarly, the grid circuits of valves 162 and 166 are tied to terminal 186, which is intermediate resistor 170 and the anode of valve 164. These grid circuits include resistors 188, 190, and 192 and the just-mentioned grid circuit for valve 166 includes a delaying condenser 194. Finally, the grid circuits for valves 164 and 166 are tied to terminal 196, which is intermediate resistor 168 and the anode of valve 162. These grid circuits include as indicated a delaying condenser 198 and resistors 200, 202, and 204. The grids of all of the counter-tubes are tied, in parallel with each other, to the previously described oscillator terminal 156. Each such grid circuit includes a small blocking condenser 206. It will be appreciated accordingly that each time a positive impulse is applied to terminal 156, such impulse is transmitted to the grids of the three counter-valves and correspondingly elevates the potentials of these grids to a positive value with respect to their cathodes. The small blocking condensers 206 are charged up very quickly and consequently cause each such impulse to be of the sharply peaked form shown in portion VIII of Figure 2, the potential of terminal 156 being shown in portion VII of such figure.

The functioning of this counter-circuit, in general, is such that, at any given time, two of the three counter-valves are conductive and the remaining counter-valve is non-conductive. Each time a positive impulse is delivered from the oscillator circuit to the grids of these valves, the non-conductive valve is fired or rendered conductive. This action does not alter the conductivity of one of the remaining two valves but it does extinguish the remaining valve. Thus, for example, during an interval between two successive impulses of the oscillator circuit, valves 162 and 164 may be conductive and valve 166 may be non-conductive. The next impulse fires valve 166 and extinguishes valve 162, leaving valve 164 conductive. The next impulse from the oscillator circuit fires valve 162 and extinguishes valve 164, leaving valves 162 and 166 conductive. The next impulse from the oscillator circuit fires valve 164 and extinguishes valve 166. More particularly, operation of the counter-network is as follows: Assuming that valves 162 and 164 are conductive, it will be appreciated that terminals 196 and 186 have potentials which are above ground by only the amount of the voltage drops through valves 162 and 164, the balance of the voltage between ground and conductor 174 being consumed in resistors 168 and 170. The grids of valves 162, 164, and 166 are connected through resistors 208, 210, and 212, to terminal 214, the potential whereof is somewhat below ground, for example, 35 to 50 volts below ground. The ratio of the resistors 204 and 190 (which are connected to the aforesaid terminals 196 and 186) to resistor 212 is such that under the conditions stated, the grid of valve 166 is negatively biased, which action renders valve 166 non-conductive. At the same time, the grids of valves 162 and 164 are connected through resistor 180 on the one hand and resistor 182 on the other hand, to terminal 176. Since valve 166 is non-conductive, terminal 176 is at substantially the potential of conductor 174, which potential is very materially higher than that of terminals 196 and 186, and the last-mentioned connections thus serve to maintain the grids of valves 162—164 at potentials which are slightly above ground and at which these valves are in wide-open condition.

It will be noticed that under the above described conditions the blocking condensers 184 and 198 receive charges, of the indicated polarities, the charge on condenser 184 attaining a value equal to the drop across resistor 180 and the charge on condenser 198 attaining a value equal to the drop across resistor 202.

Assuming now that the potential of terminal 156 associated with the oscillator circuit is abruptly elevated, as described above, by the flow of a surge current through the oscillator valve 140, it will be appreciated that this action applies a peaked positive impulse, also as aforesaid, to the grids of each of the counter-valves 162, 164, and 166. This action of itself, is without effect on valves 162 and 164, in view of the fact that the grids thereof are already at wide-open positive values. This action does, however, positively bias the grid of valve 166 and renders this valve fully conductive. As soon as valve 166 becomes fully conductive, it immediately lowers the potential of terminal 176 to a value which is above ground only by the amount of the relatively small voltage drop through valve 166, which potential is substantially the same as the previously described potentials of terminals 196 and 186. The drop in potential of terminal 176 tends to but does not negatively bias the grid of valve 164, since this tendency is opposed by the impulse from oscillator circuit. The drop in potential of terminal 176, however, does immediately drive the grid of tube 162 to a negative potential, relative to its cathode, because of the charge on condenser 184. As soon as this action occurs, valve 162 becomes non-conductive and elevates the potential of terminal 196 to a value corresponding to the previously described potential of terminal 176; that is to a potential substantially equal to that of conductor 174. With terminal 196 at the relatively high potential, the grids of valves 164 and 166 are held positive so that these valves are substantially wide-open, through circuits corresponding to those previously described in connection with valves 162 and 164. Similarly, with both valves 164 and 166 conductive, the grid of valve 162 is negatively biased in a manner analogous to that previously described in connection with the negative bias on the grid of valve 166. The single described impulse from the oscillator circuit therefore serves to extinguish valve 162, leaving valves 164 and 166 conductive. It is believed to be evident that in an analogous manner, the next impulse from the oscillator circuit is effective, by firing valve 162, to extinguish valve 164, leaving valves 152 and 166 conductive. Similarly, a succeeding impulse is effective, by firing valve 164 to extinguish valve 166, leaving valves 162 and 164 conductive.

Each on or conductive interval of each counter-valve is therefore equal in length to twice the period of the oscillator circuit, and each off or non-conductive interval of each counter-valve is equal to one period of the oscillator circuit. Stated in another way each "cycle" comprising one on and one off interval of each counter-valve, is equal in length to three periods of the oscillator. Moreover, the cycles of the respective counter-valves have a phase displacement of one period of the oscillator; that is, a phase displacement of one third of a full cycle of each counter-valve. These phase relations are indicated in portions IX, X, and XI, of Figure 2. Thus, assuming an oscillator frequency of 2,400 cycles, each counter-valve has a frequency of 800 cycles.

In the present system, each change from a non-conductive to a conductive condition of each counter-valve is utilized to trigger the corresponding inverter network 134. Each such inverter comprises a pair of high vacuum valves, designated 220, 222, 224, 226, 228, and 230. Each such valve comprises main and auxiliary anodes, a control grid and an indirectly heated cathode. Usual screen grid valves are usable and are indicated in the drawings, the screen grids serving as the auxiliary anodes. Since these inverter networks are identical, a description of one thereof will suffice for all. Considering the inverter network associated with output phase 14, and which comprises valves 220 and 222, the cathodes of these valves are connected to the ground conductor 232. The anodes of these valves are connected to the corresponding terminals of the primary winding 106 of the associated control transformer 100, which winding has a center tap 236 which is continuously connected to supply conductor 238, which is continuously maintained at a potential of, for example, 300 volts above ground. A stabilizing resistor 240 is connected across the primary winding 106. The screen grids 242 and 244 of valves 220 and 222 are continuously connected, through control resistors 246 and 248, to a supply conductor 250 which is continuously maintained at a potential somewhat below the potential of conductor 238. For example, conductor 250 may be maintained at a potential of approximately 240 volts above ground.

The control grid 252 of valve 220 is connected, through a network comprising a condenser 254 and a resistor 256, to terminal 258 which is intermediate resistor 248 and the anode of the companion valve 222. The control grid 260 of valve 222 is similarly connected, through a network comprising resistor 262 and condenser 264, to terminal 266. Grids 252 and 260 in turn are interconnected together through condensers 268 and 270. Conductor 272, which is connected to the anode of the corresponding counter-valve 162, is connected to terminal 274, intermediate the last-mentioned condensers. Conductor 272 includes a blocking condenser 276, and is connected to the ground conductor 232 through a relatively high resistance 278 and a continuously conductive rectifier 280, of usual form. Grids 252 and 260 are also connected, through associated resistors 282 and 284 to conductor 286 which is continuously maintained at a potential well below ground; for example, at a potential of minus 240 volts.

At any given time one of the inverter valves 220—222 is conductive and the companion inverter valve is biased to a non-conductive condition. A feature of the present invention resides in utilizing the anode-cathode circuit of each inverter valve to supply the associated control transformer 100, through the above-mentioned connections; and in utilizing the screen grids of these inverter valves as auxiliary anodes to provide an output circuit for each valve to produce the inverter action. The inverter action may thus be described independently of the primary output circuits of these valves.

More particularly, and assuming that valve 220 is fully conductive, it will be appreciated that a substantial part, for example, two-thirds, of the voltage difference between conductor 250 and the grounded cathode is consumed in resistor 246, leaving terminal 266 at a potential which is above ground only by the amount of the voltage drop through valve 222.

The impedance of the network between terminal 266 and the negative conductor 286, and comprising resistor 262, condenser 264, and resistor 284 is such that terminal 288 of this network, to which grid 260 is connected, is at a sufficiently negative potential with respect to ground to completely bias valve 260 to a non-conductive condition. Under these conditions, the only voltage drop through resistor 248 is due to the current flowing in the network connection between conductors 250 and 286, and comprising resistor 248, condenser 254, resistor 256, and resistor 282. The impedance of this network is such that under the indicated conditions terminal 290, to which grid 252 is connected, is maintained at a potential with respect to the cathode of valve 220, at which this valve is in a wide-open condition. Under the above conditions, further, condensers 268 and 270 contain variable charges, depending upon the stage of the inverter cycle then in progress.

Each time counter-valve 162 changes from a conductive to a non-conductive condition, the potential of the associated terminal 292 abruptly rises, as will be clear from the previous description. This increase in voltage, except in negligible part, is not communicated to terminal 274 of the inverter circuit, since under the indicated conditions, rectifier 280 affords virtually a short-circuit between conductor 272 and ground. Such increase in voltage does apply a potential to and charge up the small blocking condenser 276.

Each time counter-valve 162 becomes conductive, the potential of terminal 292 abruptly falls to a considerably lower value, as will be clear from the previous description. This action immediately pulls terminal 290 down to a potential which is below the potential of terminal 292 by the amount of the charge on condenser 276. The constants of the circuit, including terminals 290 and 292, are such that the just-mentioned drop in the potential of terminal 290, produced by valve 162, is transitory in character.

The peaked negative impulse (portion XII, Figure 2) thus applied to terminal 290 serves to reduce the positive bias of the grid of valve 220. This action in turn decreases current flow between its cathode and its auxiliary anode or screen grid 242. The latter action in turn decreases the voltage drop across resistor 246, thereby elevating the potentials of terminals 266 and 288 and opening up valve 222. The opening of valve 222 increases the drop across resistor 248 and correspondingly lowers the potentials of terminals 258 and 290. The lowering of the potential of terminal 290 still further reduces the conductivity of valve 220 which is reflected as an increase in the conductivity of valve 222. The above described negative impulse accordingly serves to initiate a progressive swing of valves 220 and 222, which swing takes place exceedingly rapidly, with respect to the frequencies involved in the present system, and serves to completely open valve 222 and completely block off valve 220.

The next time counter-valve 162 becomes non-conductive, the positive impulse applied to terminal 292 is suppressed as before, making no change in the conductivities of the inverter valves. On the other hand, the next time counter-valve 162 becomes non-conductive, a peaked negative impulse is again applied to terminal 274. Since the inverter circuit is symmetrical, it will be appreciated that this negative impulse serves to block off valve 222 and render valve 220 fully conductive. Under the assumed conditions of a frequency of 800 cycles for the action of counter-valve 162, it will be appreciated that each of the inverter valves is thus cycled by the conductive and non-conductive conditions at the rate of 800 times a second, which corresponds to a frequency of the inverter circuit of 400 cycles.

Considering now the principal output circuits of the inverter valves, it will be appreciated that so long as inverter valve 220 is conductive, current flow in the corresponding portion of the primary winding of the associated control transformer 100 is in a direction to establish one polarity for the secondary or output windings 112 and 114 of this transformer. So long as valve 222 is conductive, on the other hand, an opposite polarity is established for windings 112 and 114.

As previously mentioned it is preferred that the output voltages of windings 112 and 114 be of square wave form. Accordingly, in the present system, the impedance of the main anode-cathode circuits of inverter valves 220 and 222, are such that when either of these valves is rendered conductive, current through the corresponding main anode circuit rises gradually and substantially linearly to a maximum value, which is attained at approximately the same time that the next inverter or flip-flop action occurs. When such action occurs current flow in the just-mentioned circuit is abruptly interrupted and a gradual rise in current flow through the main anode circuit of the other inverter valve is initiated. Current flow in the primary winding portions of the control transformer 100 is consequently of saw-tooth form and results in the approximately square wave form secondary outputs indicated in portion IV of Figure 2.

It is believed to be evident that the inverter networks comprising valves 224—226 and valves 228—230 function in the manner described above in connection with valves 220—222, in response respectively to the change from non-conductive to conductive condition of the associated counter-valves 164 and 166. Consequently, transformers 100—102—104 deliver square wave secondary outputs having phase displacements of 120 electrical degrees, the frequency of such outputs being determined by the adjustably fixed frequency of the associated oscillator circuit 130.

A further feature of the present invention resides in providing means to properly synchronize the counter-networks for the several units.

Referring to Figures 1C and 1D together, it will be noticed that auxiliary valve 300 is provided. This valve may be of usual three element high vacuum type. The anode of valve 300 is continuously connected to the grid 302 of valve 166 in Figure 1D. The cathode of valve 300 is continuously connected to terminal 214 which as indicated is somewhat below ground, and the grid thereof is continuously connected to terminal 304, which is negative with respect to terminal 214. It will be appreciated from a previous description that while valve 166 of Figure 1C is conductive, the potential of terminal 308 is relatively low. Assuming control switch 306 is closed, with valve 166 conductive, it will be appreciated that the difference in potential between terminals 308 and 310 is absorbed in condenser 312, leaving the grid of valve 300 negatively biased. The connection between valve 300 and valve 166 of Figure 1D is thus without effect. As soon, however, as valve 166 of Figure 1C is extinguished, the potential of terminal 308 is abruptly elevated, thereby positively biasing valve 300 and rendering it conductive. When valve 300 is rendered conductive, it brings the potential of the grid 302 of valve 166 (Figure 1D) to a strongly negative value with respect to its cathode. If at the time this occurs, such valve 166 is non-conductive (which is the condition assuming the counter-circuits for the two units are in proper step with each other) such negative biasing is without effect. If, however, the counter-circuits should be out of step with each other, such negative biasing would immediately extinguish valve 166 of Figure 1D. Such extinguishment would have the same effect as though it had been caused by an impulse by the associated oscillator circuit. The just-mentioned synchronizing circuit thus serves to insure, when the units are placed in operation, that they are in proper step with each other.

A further feature of the invention resides in the provision of improved means for insuring that the inverter networks for each unit are in proper step with each other, and to further insure that such inverter networks for a plurality of units are in step with each other. The need for such synchronization arises, as will be understood, from the fact that a negative impulse from, for example, counter-valve 162, is effective to fire one or the other of the two inverter valves 220 and 222, depending upon which of these valves was last fired. As shown, conductors 234 and 235 serve to connect the control grids of valves 220 and 224 respectively, to the auxiliary anode or screen grid 237 of valve 230, through small blocking condensers 239 and 241. It will be appreciated that in view of the phase relations established by the counter-network, three of the inverter valves 220, and so forth, are conducting at any given time and moreover each time inverter valve 228 is rendered conductive, valves 220 and 224 should already be in a conductive condition. It will be appreciated that each time inverter valve 228 is rendered conductive, the potential of screen grid 237 of valve 230 rises sharply. This positive impulse is communicated, through the blocking condensers 239 and 241 to the control grids of valves 220 and 224. If these valves are already conductive (which is the condition if the inverter circuits are in proper step with each other), these positive impulses are without effect. If, on the other hand, either of valves 220 and 224 should be non-conductive (which is the condition if the inverter networks are out of step) such positive impulse would immediately render the non-conductive valve conductive and bring the circuits into step with each other. It wil be noticed that the above synchronizing circuits are provided for both units, Figures 1C and 1D.

In addition, in order to insure that the inverter networks for both units are in proper step with each other, the screen grid of valve 230 for the unit of Figure 1C, is arranged for connection, through a small blocking condenser 243 and a normally opened manually operable synchronizing switch 245, to the control grid 247 of inverter valve 228 associated with the unit of Figure 1D. With this arrangement, it will be noted that each time inverter valve 228 of Figure 1C becomes conductive, the consequent rise in potential of the associated screen grid 237 of valve 230, causes a positive impulse to be transmitted to the control grid of valve 228 associated with the unit of Figure 1D. If this valve is already conductive (which is the condition if the inverter networks for the two units are in step) this positive impulse is without effect. On the other hand, if such networks are out of step, such impulse brings them into step.

In the present instance no source of energy for supplying the direct current power circuits have been indicated. It will be understood that these power circuits may be supplied from any suitable source. For example, a portion of the three phase output of the system may be utilized for this purpose. Alternatively, and as is described in more detail in the aforesaid copending Nims application, an auxiliary or pilot generator may be provided to supply the control energy.

Although only a single complete embodiment of the invention has been described in detail, it will be appreciated that various modifications in the form, number, and arrangement of the parts may be made without departing from the spirit and scope of the invention.

What is claimed is:

1. In a system for delivering multiphase alternating current energy to an output circuit from a source of multiphase alternating current energy, a plurality of translating units each individual to a corresponding phase of said output circuit, each unit comprising a pair of electric valve means each valve means defining a plurality of discharge paths having a common cathode connection and a plurality of anodes coupled to corresponding phases of said source, means coupling each pair of said valve means to the corresponding output phase so that current flow through the individual means of each pair tends to cause, respectively, current flow of respectively opposite polarity in the corresponding phase of the output circuit, periodically actuable control means for each unit so constructed and arranged as to provide for successively rendering as an entity the corresponding valve means of each pair conductive and non-conductive in alternate relation so that current may flow from whichever anode of the valve means is at the higher potential with respect to the common cathode potential of the valve means, and timing means for actuating the several control means in predetermined phase relation to each other.

2. The system of claim 1 wherein each phase of said source is common to all of said units.

3. The system of claim 1 wherein each phase of said source is common to one path of each valve means of each unit.

4. The system of claim 1 wherein each phase of said source is common to all of said units but is operatively connected to only one path in each such unit.

5. Apparatus for supplying a multiphase load circuit comprising a plurality of systems each as defined in claim 1 and means connecting the respective output circuits in parallel to said load circuit.

6. In a system for supplying a multiphase load circuit comprising a plurality of systems each system having a plurality of translating units individual to said phases and common to said source, each unit including means actuable to translate energy from the source into single-phase alternating current energy and deliver the same to a corresponding phase of said output circuit, each system having control means for actuating the units of each system in predetermined phase relation to each other so that the respective phases of the output circuit of each system have corresponding phase relations, means connecting the respective output circuits in parallel to said load circuit, and means including regulating means for controlling the division, between said units, of the energy supplied to said load circuit.

7. In a system for delivering multiphase alternating current energy to a load circuit from a source of multiphase alternating current energy comprising a plurality of systems each having an output circuit, each system having a plurality of translating units individual to a corresponding phase of its output circuit, each unit comprising a pair of electric valve means, each of said valve means defining a plurality of discharge paths having a common cathode connection and a plurality of anodes coupled to corresponding phases of said source, means coupling the valve means in each unit to the corresponding output phase of its output circuit, so that current flow to the individual means of each pair tends to cause, respectively, current flow of respectively opposite plurality in the corresponding phase of the corresponding output circuit, periodically actuable control means for each unit of each system for successively rendering the corresponding valve means conductive and nonconductive in alternate relation, timing means for actuating the several control means of each system in predetermined phase relation to each other, means connecting the respective output circuits in parallel to said load circuit, and means including regulating means for controlling the division, between said units, of the energy supplied to said load circuit.

8. In a system for supplying a multiphase alternating current output circuit from a source of electric energy, the combination of a plurality of translating units individual to said phases and common to said source, each unit including means actuable to translate energy from the source to single-phase alternating current energy and delivering the same to a corresponding phase of said output circuit, a source of periodic control voltage common to said units, a counter-network including an electric valve individual to each phase of the aforesaid output circuit, control means coupling said valves to said source of periodic control voltage so that the conductivities of said valves are altered in predetermined succession, and means rendering each control means operably responsive to the condition of the associated said valve.

9. In a system for delivering multiphase alternating current energy to a load circuit from a source of alternating current energy having a plurality of phases, a plurality of translating units each individual to a corresponding phase of said load circuit, each unit comprising electric valve means defining a plurality of discharge paths the anodes whereof are connected to corresponding terminals of corresponding ones of said phases and additional electric valve means defining a plurality of discharge paths the anodes whereof are connected to corresponding ones of said phases, translating means for each unit connected between the cathodes of each of the valve means of the respective unit and another terminal of each of the phases which are connected to the anodes of the valve means of the respective unit and, current flow in each valve means tending to cause current flow in a corresponding direction in the corresponding translating means, control means for each of said units operable to alternately render the valve means conductive, and means coupling the load circuit of each unit to the respective translating means so that successive current impulses passed by the respective valve means cause current flow in respectively opposite directions in the respective load circuits, and timing means for actuating each of said control means in predetermined phase relation to each other.

10. In a system for delivering multiphase alternating current energy to a load circuit from a source of multiphase alternating current energy, a plurality of translating units each individual to a corresponding phase of said load circuit, each unit comprising a pair of electric valve means, each valve means defining a plurality of discharge paths having a common cathode connection and a plurality of anodes coupled to various phases of said source, an output circuit for each unit, each of said output circuits including a reactive device having opposite end connections and a center tap connection, means coupling the common cathode connections of one of each of said valve means of each unit to one end connection of the corresponding reactive device, means coupling the common cathode connection of the other of each of said valve means of each unit to the other end connection of the corresponding reactive device, an impedance device for each pair of valve means, means coupling the center tap connection of each reactive device to the corresponding one of the impedance devices, means coupling said impedance devices to said source, and means for actuating said units in predetermined phase relation to each other so that the respective phases of the load circuit have corresponding phase relations.

11. In a system for delivering multiphase alternating current energy to a load circuit from a source of multiphase alternating current energy, a plurality of translating units each individual to a corresponding phase of said load circuit, each unit comprising a pair of electric valve means, each valve means defining a plurality of discharge paths having a common cathode connection and a plurality of anodes coupled to various phases of said source, an output circuit for each unit, each of said output circuits including a reactive device having opposite end connections and a center tap connection, means coupling the common cathode connections of one of each of said valve means of each unit to one end connection of the corresponding reactive device, means coupling the common cathode connection of the other of each of said valve means of each unit to the other end connection of the corresponding reactive device, an impedance device for each pair of valve means, means coupling the center tap connection of each reactive device to the corresponding one of the impedance devices, means coupling said impedance devices to said source, a capacitor means connected between the common cathode connection of each unit, and means for actuating said units in predetermined phase relation to each other so that the respective phases of the load circuit have corresponding phase relations.

12. In a system for delivering multiphase alternating current energy to an output circuit from a source of multiphase alternating current energy, a plurality of translating units each individual to a corresponding phase of said output circuit, each unit comprising a pair of electric valve means each defining a plurality of discharge paths having a common cathode connection and a plurality of anodes coupled to corresponding phases of said source, means coupling the valve means of each unit to the corresponding output phase so that current flow through the individual means of each pair tends to cause, respectively, current flow of respectively opposite polarity in the corresponding phase of the output circuit, periodically actuable control means for each unit for successively rendering the corresponding valve means conductive and nonconductive in alternate relation, a source of periodic control voltage common to said units, a counter-network including an electric valve individual to each phase of the aforesaid output circuit, means coupling said valves to said source of periodic control voltage so that the conductivities of said valves are altered in predetermined succession and at a frequency of twice that of the output circuit, and means rendering each control means operably responsive to the condition of the associated said valve.

13. In a system for supplying a multiphase alternating current output circuit from a source of electric energy, the combination of a plurality of translating units individual to said phases and common to said source, each unit including means actuable to translate energy from the source to single-phase alternating current energy and delivering the same to a corresponding phase of said output circuit, a source of periodic control voltage common to said units, a counter-network including an electric valve individual to each phase of the aforesaid output circuit, means coupling said valves to said source of periodic control voltage so that the conductivities of said valves are altered in predetermined succession and at a frequency of twice that of the output circuit, and means including an inverter network individual to each phase of the output circuit, each such inverter network being operably responsive to the condition of the associated electric valve.

14. In a system for delivering multiphase alternating current energy to an output circuit from a source of multiphase alternating current energy, a plurality of translating units each individual to a corresponding phase of said output circuit, each unit comprising a pair of electric valve means each defining a plurality of discharge paths having a common cathode connection and a plurality of anodes coupled to corresponding phases of said source, means coupling the valve means of each unit to the corresponding output phase so that current flow through the individual means of each pair tends to cause, respectively, current flow of respectively opposite polarity in the corresponding phase of the output circuit, periodically actuable control means for each unit for successively rendering the corresponding valve means conductive and nonconductive in alternate relation, a source of periodic control voltage common to said units, a counter-network including an electric valve individual to each phase of the aforesaid output circuit, means coupling said valves to said source of periodic control voltage so that the conductivities of said valves are altered in predetermined succession, means including an inverter network individual to each phase of the output circuit, each such inverter network having a pair of valves, and circuit means operatively connecting said valves of said counter-network to said corresponding pairs of valves whereby alternate ones of each of said corresponding pair of valves are rendered conductive by consecutive alterations of the conductivity of said corresponding counter-network valve.

15. In a system for controlling the phase angle and frequency of a multiphase alternating current circuit, the combination of a source of periodic control voltage common to all of such phases, a counter-network including an electric valve individual to each such phase, means coupling said valves to said source of periodic voltage so as to render each of said valves conductive once each half-cycle of said circuit and conductive in rotation, and means operably responsive to the conductivity of each valve for producing a control voltage for the corresponding phase.

16. In a system for controlling the frequency and phase angle of a multiphase alternating current load circuit electrically coupled to an input circuit, the combination of a source of pulsating control voltage common to such phases, means for controlling the frequency of the pulsating output of said voltage source at a frequency equal to two times the product of the desired frequency of the load circuit and the number of load-circuit phases, a counter-network including an electric valve individual to each such phase, means coupling said valves to said source of periodic voltage so as to alter the conductive conditions of said valves in rotation, and means including an inverter network individual to each said valve and operably responsive to the condition thereof for producing control voltages for the corresponding phase.

PAUL T. NIMS.
OMER E. BOWLUS.

Certificate of Correction

Patent No. 2,409,581.

October 15, 1946.

PAUL T. NIMS ET AL.

It is hereby certified that errors appear in the printed specification of the above numbered patent requiring correction as follows: Column 3, line 37, for "values" read *valves*; column 5, line 43, for "rectifiers" read *valves*; and that the said Letters Patent should be read with these corrections therein that the same may conform to the record of the case in the Patent Office.

Signed and sealed this 15th day of July, A. D. 1947.

[SEAL]

LESLIE FRAZER,
*First Assistant Commissioner of Patents.*